United States Patent
Brostmeyer

(10) Patent No.: US 8,640,437 B1
(45) Date of Patent: Feb. 4, 2014

(54) MINI SIZED COMBINED CYCLE POWER PLANT

(75) Inventor: Joseph D Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 582 days.

(21) Appl. No.: 13/033,633

(22) Filed: Feb. 24, 2011

(51) Int. Cl.
- *F02C 6/18* (2006.01)
- *F01K 23/10* (2006.01)
- *F02C 7/36* (2006.01)

(52) U.S. Cl.
USPC ............................ 60/39.182; 60/39.163

(58) Field of Classification Search
USPC .................................... 60/39.182, 39.163
See application file for complete search history.

(56) References Cited

U.S. PATENT DOCUMENTS

| | | | | |
|---|---|---|---|---|
| 3,693,792 A | * | 9/1972 | Lang | 209/212 |
| 3,703,807 A | * | 11/1972 | Rice | 60/39.182 |
| 4,267,692 A | * | 5/1981 | Earnest | 60/39.182 |
| 5,906,095 A | * | 5/1999 | Frutschi et al. | 60/39.182 |
| 6,070,404 A | * | 6/2000 | Bosley et al. | 60/772 |
| 6,223,523 B1 | * | 5/2001 | Frutschi | 60/39.182 |
| 6,966,753 B2 | * | 11/2005 | Long et al. | 415/213.1 |
| 7,013,632 B2 | * | 3/2006 | Takai et al. | 60/39.182 |
| 7,882,692 B2 | * | 2/2011 | Pronske et al. | 60/39.182 |
| 7,966,102 B2 | * | 6/2011 | Kirchhof et al. | 60/39.182 |

OTHER PUBLICATIONS

Pilavachi, "Mini- and micro-gas turbines for combined heat and power", 2002, Appl. Therm. Eng. 22(2002), pp. 2003-2014.*

* cited by examiner

*Primary Examiner* — Ted Kim
(74) *Attorney, Agent, or Firm* — John Ryznic

(57) ABSTRACT

A mini combined cycle power plant with a mini gas turbine engine that operates at around 20,000 to 30,000 rpm and is connected to an electric generator through a speed reduction gear box, a low pressure steam turbine connected directly to the gas turbine engine, a high pressure steam turbine connected to the low pressure steam turbine through a smaller gear box so that the high pressure steam turbine can operate at around 70,000 to 100,000 rpm, and a heat recovery steam generator to use the turbine exhaust to produce high pressure steam for the two steam turbines. Leftover heat from the HRSG is used to heat homes or buildings in the local area to the power plant to improve the overall efficiency of the plant.

5 Claims, 2 Drawing Sheets

MINI SIZED COMBINED CYCLE POWER PLANT

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a combined cycle power plant, and more specifically to a power plant configuration for efficient combined heat and power production in a small size.

2. Description of the Related Art including information disclosed under 37 CFR 1.97 and 1.98

A power plant is used to produce electricity for use in the general area or transmitted to far away areas where demand is high and production is low. Electric producing power plants are of the type such as a nuclear plant, a coal burning plant or a natural gas burning plant. Coal burning power plants are not desirable because of the pollutants discharged from the exhaust. Natural gas burning power plants are favorable because they are cleaner than the coal burning plants.

The design of an electricity producing power plant is directed to producing the most efficient electrical power. Thus, the most highly efficient power plants tend to be very large power plants that are a permanent fixture in an area. Because of the very large size, these large power plants can produce enough electrical energy to be distributed to vary large areas.

The idea of using waste heat for increased steam generation in industry has been around for many years. The progressive increase in fuel costs, the need to capture heat from various industrial processes and the increasingly stringent environmental regulations has created the need for using waste heat to its fullest potential.

In the power industry, the waste heat from one power system such as a gas turbine engine can serve as the heat source for a steam turbine cycle. Such a system is referred to as a combined cycle and can reach overall electrical power cycle efficiency to nearly 60%. A combined cycle power plant integrates two or more thermodynamic power cycles to more fully and efficiently convert input energy to work or power. With the advancements in reliability and availability of gas turbine engines, the term combined cycle power plant usually refers to a system that includes a gas turbine engine, a heat recovery steam generator (HRSG) and a steam turbine. Thermodynamically, this implies the joining of a high temperature Brayton gas turbine engine cycle with a moderate and low temperature Rankine cycle where the waste heat from the Brayton cycle exhaust is used to heat input to the Rankine cycle. Where the heat recovery steam generator supplies at least part of the steam for a process, the application can be referred to as cogeneration.

A simple combined cycle power plant includes a single gas turbine engine with an electric generator, a heat recovery steam generator (HRSG), a single steam turbine and electric generator, and a condenser and auxiliary systems. FIG. 1 shows a prior art combined cycle power plant with a gas turbine engine, a HRSG and a steam turbine. The FIG. 1 power plant includes a gas turbine engine with a compressor 12, a combustor 13 and a turbine 14 that drives a first electric generator 11, where the turbine exhaust is delivered to a HRSG 15 that includes a stack 22 for discharge of the exhaust and a steam turbine 16 that drives a second electric generator 17. The HRSG includes a condenser 18, a condensate pump 19, a de-aerator 20 and a boiler feed water pump 21.

The modern 250 MW natural gas fired combined cycle power plant is the most economic option for new electric power production. The power plant efficiency is around 58% for electricity at the power plant, the natural gas fired plant is less than 50% $CO_2$ production when compared to a coal fired power plant, and the power plant is very reliable with power produced anytime and with 50,000 plus hours of component life. However, some major disadvantages exist in this type of power plant. Of the fuel energy input, 32% of the energy is wasted heating rivers or the atmosphere from the steam condenser cooling. The condenser cooling heat from the power plant cannot be reused because of the far location of the plant to any potential users of the heat. For example, the heat could be used to heat a building but is not feasible because the heat would cool to atmospheric temperature from the long distance carried from source to end user. Also, more than 7% of the electricity produced is wasted in transmission line losses. Because they are so large, they produce a large amount of electricity which requires a large electrical grid and long power lines to transmit the power to relatively far away locations. Thus, the loss of electrical energy due to the long transmission line loses.

BRIEF SUMMARY OF THE INVENTION

A small combined cycle electric power plant of less than 6 MW utilizing an efficient high pressure condensing steam turbine that is portable (easy to transport and install), is located close to end users so that transmission line losses are eliminated and waste heat can be utilized, eliminates the 7% electrical transmission (T&D) losses associated with the large power plants, can be set up in remote locations, offers affordable power plant and affordable cost of electricity, and is platform designed to be upgradable to F and G class temperatures for even higher efficiencies.

A mini sized high pressure steam turbine is required for this mini sized combined cycle power plant. Larger gas turbines and steam turbines can be scaled down only so far before the smaller size becomes a major design issue. As the size of the gas turbine or steam turbine decreases, the rotational speed increases. At a certain rotational speed, significant rotor dynamics, bearing designs and aerodynamic loss mechanism issues arise that limit the scalability. Rotor dynamic issues such as vibration modes arise that will cause the rotor shaft to explode from vibration must be accounted for. An entire new design is required for turbines that are to be scaled down below a size in which these rotor dynamic issues become major design problems.

The mini power plant is an affordable power plant that produces affordable electricity at around $1,500 per kW, produces 5.5 MW of electricity plus 3.8 MW heat (for schools, offices, hospitals, district heating), is efficient with 50% electric and 85% CHP, and is clean burning with low NOx emissions from burning natural gas or syn-gas or hydrogen.

The power plant includes a gas turbine engine connected to an electric generator through a gear box. The gas turbine engine is also connected to a low pressure steam turbine directly, and to a high pressure steam turbine through a second gear box. All of the components of the power plant are connected in series to a single rotor shaft through gear boxes. With this arrangement, the low pressure steam turbine operates at the same rotational speed as the gas turbine engine, the two steam turbines are connected to the gas turbine engine using only one gear box instead of two as in the prior art large power plants so that the one gear box used can be smaller. The power plant includes a 1,800 or 3,600 rpm electric generator, a 20,000 to 30,000 rpm gas turbine engine connected directly to the low pressure steam turbine, and a 70,000 to 100,000 rpm high pressure steam turbine connected to the low pressure steam turbine through a 3:1 or 4:1 epicyclic speed reduction gear box. The mini sized combined cycle power plant thus can be used to miniaturize a large industrial gas turbine power plant using a small gas turbine engine and have similar energy efficiency after taking into account transmission and distribution losses.

The gas turbine engine of the small power plant includes a high pressure ratio compressor, a 5 ppm NOx low emissions combustor (such as a LBNL low swirl burner), preferably an integrally bladed rotor disk, and a robust single shaft turbine arrangement. The overall size of the power plant can be carried on a flat bed truck. The compressor of the gas turbine engine is an axial or a centrifugal compressor with a shrouded impeller having an integral machined shroud in a high stress region and an electron beam welded shroud in the lower stress region in order to lower cost, improve surge margin and improve rotor dynamics due to a shorter length.

DETAILED DESCRIPTION OF THE INVENTION

Figure 2:
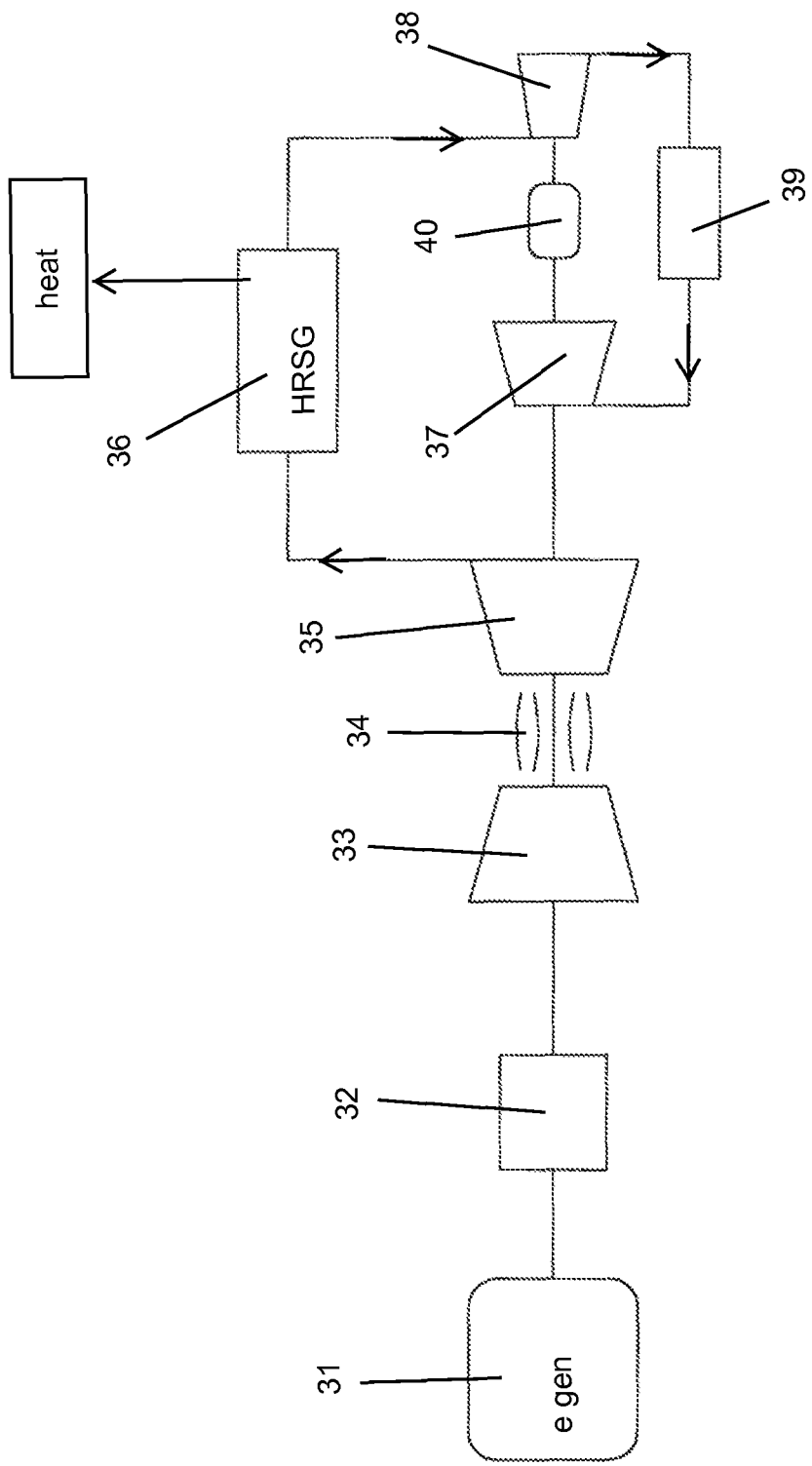
FIG. 2 shows a cross section view of the mini combined cycle power plant of the present invention.

A mini sized combined cycle power plant is shown in FIG. 2 and includes an electric generator 31, a large speed reduction gear box 32, a gas turbine engine with a compressor 33 and a combustor 34 and a turbine 35, a low pressure steam turbine 37, a small speed reduction gear box 40, a high pressure steam turbine 38, a heat recovery steam generator (HRSG) 36, and an optional reheater 39. The gas turbine engine drives the electric generator 31 through the large reduction gear box 32. The gas turbine engine also receives power directly from the low pressure steam turbine 37 and the high pressure steam turbine 38 through the small reduction gear box 40. In the mini sized combined cycle power plant, all of these components are connected in series to a common rotor shaft although with reduction gear boxes.

The electric generator operates at 1,800 or 3,600 rpm and generates electricity. The large reduction gear box 32 is a 6:1 or 7:1 epicyclic reduction gear box. The gas turbine engine operates at 20,000 to 30,000 rpm and therefore the input shaft to the large reduction gear box 32 and the low pressure steam turbine 37 both operate at 20,000 to 30,000 rpm. The high pressure steam turbine 38 operates at 70,000 to 100,000 rpm and the small reduction gear box is a 3:1 or 4:1 epicyclic reduction gear box so that the input speed of 20,000 to 30,000 rpm increases to 70,000 to 100,000 rpm in the high pressure steam turbine 38.

The turbine 35 exhaust from the gas turbine engine is passed through the HRSG 36 to heat steam to a high temperature and pressure that is then passed through the high pressure steam turbine 38. The exhausted steam from the high pressure steam turbine 38 is passed through an optional reheater 39 to add additional heat to the steam flow, and the heated steam flow is then passed through the low pressure steam turbine 37. Since both the high pressure steam turbine 38 and low pressure steam turbine 37 are rotatably connected to the gas turbine engine, and since the gas turbine engine is rotatably connected to the electric generator 31, the power output from both the high pressure steam turbine 38 and the low pressure steam turbine 37 also drives the electric generator 31.

With the power plant of FIG. 2, both the low pressure steam turbine 37 and the gas turbine engine can be operated at the same speed. This eliminates the need for a reduction gear box between the gas turbine engine and the steam turbine that is required in the prior art power plants. With the small reduction gear box 40 used between the low pressure steam turbine 37 and the high pressure steam turbine 38, a smaller reduction gear box is required than in the FIG. 1 power plant because the high pressure steam turbine would be connected to the electric generator through a larger reduction gear box to decrease the speed to 1,800 or 3,600 rpm. The small reduction gear box 40 of the FIG. 2 power plant is only required to reduce the rotational speed from 70,000 to 100,000 rpm to the 20,000 to 30,000 rpm for the operation speed of the gas turbine engine. Thus, the FIG. 2 power plant connects the steam turbines to the gas turbine engine using only one reduction gear box, and that reduction gear box can be much smaller than the FIG. 1 power plant reduction gear box.

The leftover heat from the HRSG 36 that is usually discharged through a stack in the prior art is used as heat in locations close to the power plant (close enough to the power plant so that the heat is not dissipated to the local surroundings). The leftover heat can be used to provide heat for schools, offices, hospitals, or district heating and other uses. With the power plant generating 5.5 MW of electrical energy (50% efficient) and the exhaust heat from the HRSG generating 3.8 MW for heating, the combined effect of the power plant is to produce 9.3 MW with an 85% CHP. The gas turbine engine and the steam generators can be sized from 6 MW to 1 MW to produce a mini sized combined cycle power plant that is just as energy efficient as the much larger and permanent combined cycle power plants such as the one represented in FIG. 1. However, the overall size of the mini sized combined cycle power plant is of such size that it can fit on a flat bed truck and therefore is portable. For the mini combined cycle power plant of FIG. 2, the end user net cycle LHV electric cycle efficiency is around 50%. Heat rejected to atmosphere stack loses is around 11.7%. Heat rejection to district heating is around 35.1%. The end user combined heat and power efficiency is thus around 50.1% plus around 35.1% for an efficiency of around 85.1%.

Figure 1:
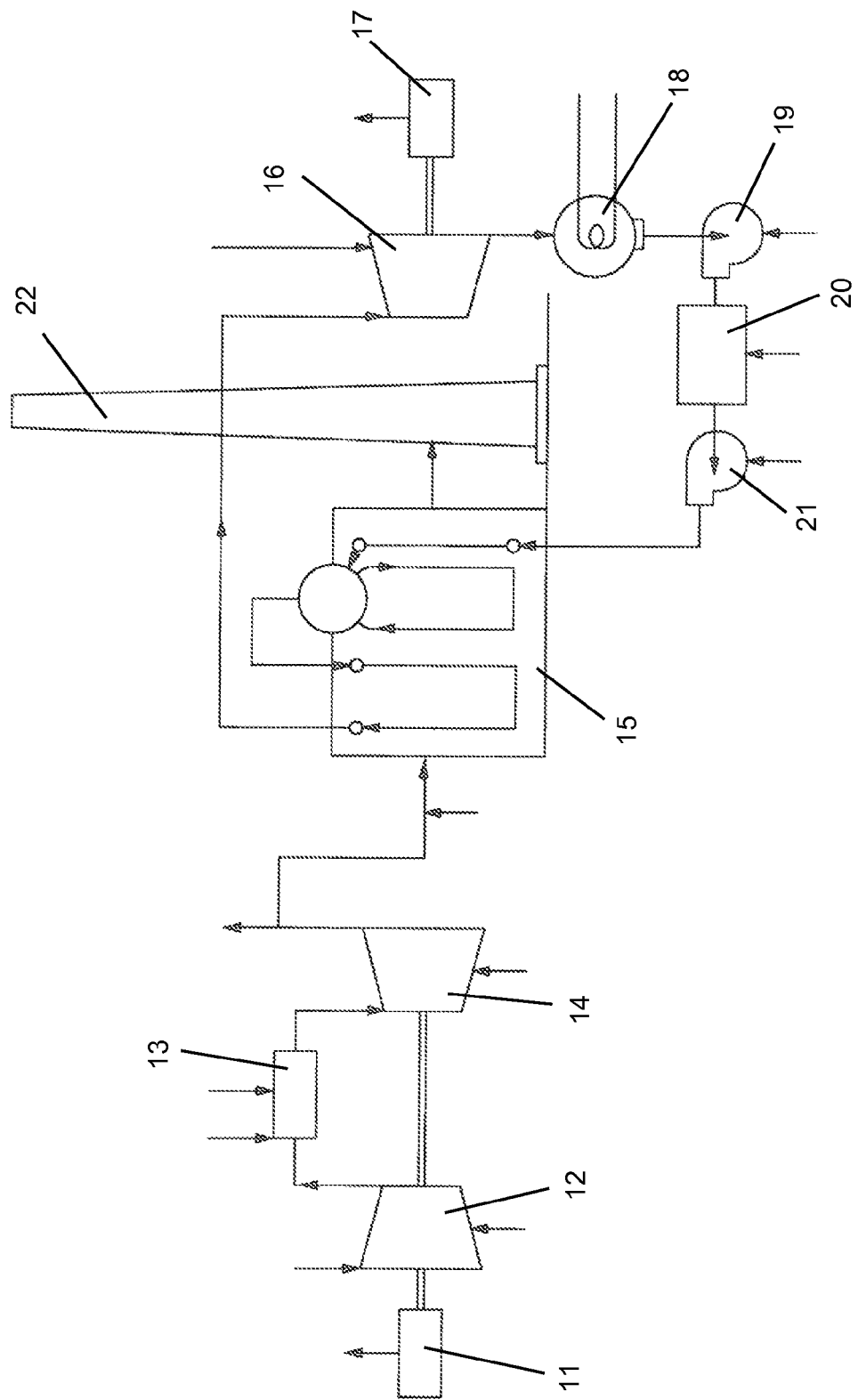
FIG. 1 shows a cross section view of a combined cycle power plant of the prior art.

The benefits of the mini sized combined cycle power plant (MSCCPP) offer several advantages over the prior art FIG. 1 power plant. The MSCCPP can be located close to the end users so that the waste heat can be utilized. The power plant eliminates the 7% electrical transmission and discharge losses associated with the FIG. 1 power plant because of the long transmission lines required. The MSCCPP can be located in remote locations where power lines are not installed or when the regular power supply has been interrupted for example from a storm or other damage. Also, when additional electric power is required, for example due to growth of the local area, additional MSCCPP units can be installed to increase the electrical power output. The MSCCPP offers an affordable power plant and affordable cost of electricity when compared to the FIG. 1 power plant. The MSCCPP platform is designed to be upgradable to F and G class temperatures for even higher efficiencies.

The gas turbine engine exhaust temperature is optimized for combined cycle efficiency. The gas turbine engine includes a high pressure ratio compressor, a 5 ppm NOx low emissions combustor such as with a LBNL low swirl burner. The low swirl combustor is disclosed in U.S. Pat. No. 5,735,681 issued to Cheng on Apr. 7, 1998 and entitled ULTRALEAN LOW SWIRL BURNER; or U.S. Pat. No. 5,879,148 issued to Cheng et al. on Mar. 9, 1999 and entitled MECHANICAL SWIRLER FOR A LOW-NOx WEAK-SWIRL BURNER; or U.S. Pat. No. 5,516,280 issued to Kostiuk et al. on May 14, 1996 and entitled APPARATUS AND METHOD FOR BURNING A LEAN, PREMIXED FUEL/AIR MIXTURE WITH LOW NOX EMISSION. All of the three patents are incorporated herein by reference. The gas turbine engine also includes an integrally bladed disk and a robust single shaft turbine arrangement. In one embodiment, the compressor of the gas turbine engine can be a single or multiple stage axial or centrifugal compressor with a shroud to provide compressor efficiency equal to that of a multiple stage axial flow compressor but much smaller and lighter and thus less costly to produce. Because of the small size, the power plant of FIG. 2 is portable and therefore easy to transport and install. The gas turbine engine operates primary using natural gas or biogas from various sources for low NOx emission. A back-up fuel can be diesel number 2 or ethanol.

I claim the following:

1. A mini combined cycle power plant comprising:
    a mini gas turbine engine having a compressor, a combustor and a turbine having a rotational speed of around 20,000 to 30,000 rpm;
    an electric generator with an operation speed of 1,800 to 3,600 rpm;
    a first gear box connected between the electric generator and the gas turbine engine such that the gas turbine engine drives the first electric generator to produce electrical energy;
    a low pressure steam turbine connected directly to the gas turbine engine;
    a high pressure steam turbine operating at around 70,000 to 100,000 rpm connected to the low pressure steam turbine through a second gear box;
    a heat recovery steam generator connected to the gas turbine engine and to the low and high pressure steam turbines such that turbine exhaust is used to produce high pressure steam that is passed through the high pressure steam turbine first and then through the low pressure steam turbine so that the two steam turbines can drive the electric generator through the gas turbine engine; and,
    a means to distribute leftover heat from the heat recovery steam generator to a local community close to the power plant for use as heat.

2. The mini combined cycle power plant of claim 1, and further comprising:
    the compressor of the gas turbine engine is a shrouded centrifugal compressor.

3. The mini combined cycle power plant of claim 1, and further comprising:
    the combustor of the gas turbine engine is a low emissions combustor with LBNL low swirl burner.

4. The mini combined cycle power plant of claim 1, and further comprising:
    the gas turbine engine is a single shaft gas turbine engine.

5. The mini combined cycle power plant of claim 1, and further comprising:
    a reheater operating between the high pressure steam turbine and the low pressure steam turbine to reheat the steam flowing between the two steam turbines.

* * * * *